United States Patent
Kameyama et al.

(10) Patent No.: US 7,739,579 B2
(45) Date of Patent: *Jun. 15, 2010

(54) STORAGE SYSTEM, CONTROL METHOD, AND PROGRAM FOR ENHANCING RELIABILITY BY STORING DATA REDUNDANTLY ENCODED

(75) Inventors: Hiroaki Kameyama, Kawasaki (JP); Shinichi Sazawa, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1034 days.

This patent is subject to a terminal disclaimer.

(21) Appl. No.: 11/443,201

(22) Filed: May 31, 2006

(65) Prior Publication Data

US 2007/0180294 A1 Aug. 2, 2007

(30) Foreign Application Priority Data

Feb. 2, 2006 (JP) .............................. 2006-025302

(51) Int. Cl.
*G11C 29/00* (2006.01)
(52) U.S. Cl. .................................................. 714/769
(58) Field of Classification Search ................ 714/763, 714/770
See application file for complete search history.

(56) References Cited

U.S. PATENT DOCUMENTS

| 5,333,143 | A | | 7/1994 | Blaum et al. |
| 5,771,248 | A | * | 6/1998 | Katayama et al. ............ 714/763 |
| 6,144,516 | A | * | 11/2000 | Takeda et al. ................. 360/75 |
| 6,307,487 | B1 | | 10/2001 | Luby |
| 6,320,520 | B1 | | 11/2001 | Luby |
| 6,373,406 | B2 | | 4/2002 | Luby |
| 6,411,223 | B1 | | 6/2002 | Haken et al. |
| 6,469,853 | B1 | * | 10/2002 | Satoh ........................... 360/48 |
| 6,675,176 | B1 | | 1/2004 | Shinkai et al. |
| 6,859,789 | B1 | * | 2/2005 | Hayashi et al. ............... 705/50 |
| 2004/0064633 | A1 | | 4/2004 | Oota |
| 2004/0117549 | A1 | | 6/2004 | Nakamura |
| 2005/0195755 | A1 | | 9/2005 | Senta et al. |

FOREIGN PATENT DOCUMENTS

| JP | 05-197579 | 8/1993 |
| JP | 2000-076207 | 3/2000 |
| JP | 2000-099282 | 4/2000 |
| JP | 2004-126716 | 4/2004 |
| JP | 2004-192483 | 7/2004 |
| WO | 2004-030273 | 4/2004 |

OTHER PUBLICATIONS

Office Action mailed Jul. 8, 2009 in corresponding U.S. Appl. No. 11/407,109.
U.S. Appl. No. 11/407,109, filed Apr. 20, 2006, Hiroaki Kameyama et al., Fujitsu Limited.

* cited by examiner

*Primary Examiner*—Esaw T Abraham
(74) *Attorney, Agent, or Firm*—Staas & Halsey LLP

(57) ABSTRACT

A storage apparatus composed of a plurality of magnetic disk devices are provided. An encoding unit generates, after dividing original data, a plurality pieces of encoded data equal to or more than the number of division by use of a code of which redundancy is variable. A redundancy control unit varies the redundancy in the encoding unit in accordance with the importance of the original data. A distribution processing unit distributes and stores the plurality of encoded data to and in the plurality of magnetic disk devices. A decoding unit retrieves the encoded data corresponding to, at least, the division number of the original data from the magnetic disk devices so as to decode the original data.

20 Claims, 16 Drawing Sheets

FIG. 9A 18-1

| KEYWORD | IMPORTANCE |
|---|---|
| W1 | V1 |
| W2 | V2 |
| W3 | V3 |
| W4 | V4 |
| W5 | V5 |

FIG. 9B 18-2

| LAST UPDATE DATE | IMPORTANCE |
|---|---|
| CURRENT DAY | V1 |
| LESS THAN 3 DAYS | V2 |
| LESS THAN 1 WEEK | V3 |
| LESS THAN 1 MONTH | V4 |
| LESS THAN 3 MONTHS | V5 |

FIG. 9C 18-3

| UPDATE FREQUENCY | IMPORTANCE |
|---|---|
| 16 TO 20 TIMES | V1 |
| 11 TO 15 TIMES | V2 |
| 6 TO 10 TIMES | V3 |
| 1 TO 5 TIMES | V4 |
| 0 TIME | V5 |

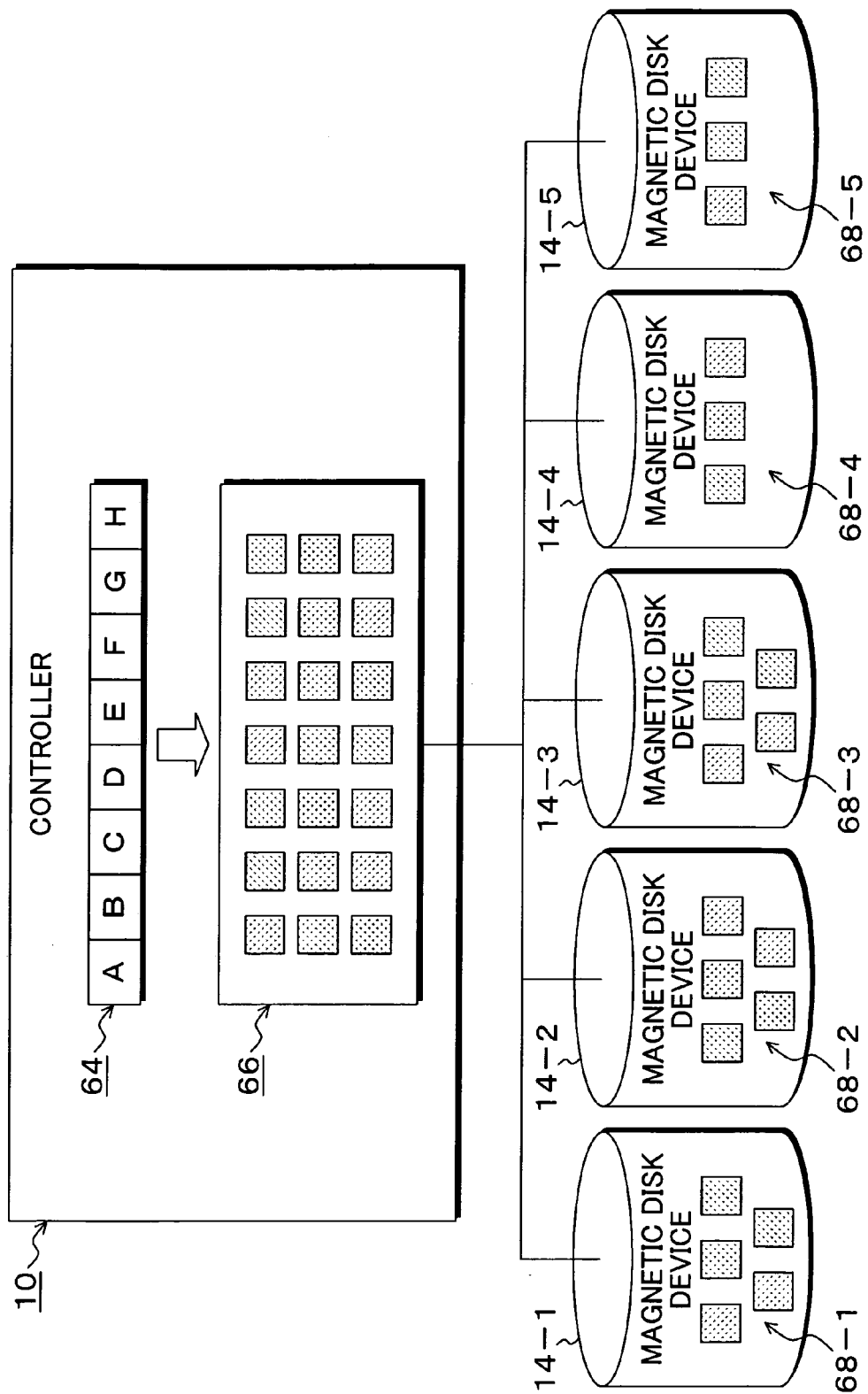

FIG. 11

| LOCAL STORAGE NO. | OPERATING RATE | RELIABILITY | NUMBER OF DISTRIBUTED DATA |
|---|---|---|---|
| 1 | A1 | R1 | D1 |
| 2 | A2 | R2 | D2 |
| 3 | A3 | R3 | D3 |
| 4 | A4 | R4 | D4 |
| 5 | A5 | R5 | D5 |

STORAGE SYSTEM, CONTROL METHOD, AND PROGRAM FOR ENHANCING RELIABILITY BY STORING DATA REDUNDANTLY ENCODED

This application is a priority based on prior application No. JP 2006-025302, filed Feb. 2, 2006, in Japan.

BACKGROUND OF THE INVENTION

1. Field of the Invention

The present invention relates to a storage system having a large-capacity storage apparatus which is comprised of a combination of storage devices such as a plurality of magnetic disk devices, to a control method thereof, and to a program; and particularly relates to a storage system for enhancing reliability against failure by causing data, which is to be recorded in a storage apparatus, to be redundant and encoded, a control method thereof, and a program. 2. Description of the Related Arts Conventionally, in order to protect data in a medium of a magnetic disk device from failure, unexpected accidents, etc., RAID (Redundant Arrays of Independent Disks) is provided as a generally used technique. Although the levels of RAID include RAID level 0 to RAID level 6 in accordance with its use, typical ones used as techniques for enhancing safety of data are RAID 1, RAID 5, and RAID 6. RAID 1 is generally realized by use of two disks. This is the simplest method in which failure tolerance of the disks is enhanced by writing the same data to two disks, and called mirroring.

FIG. 1 shows a storage system to which RAID 1 is applied, wherein, for example, five magnetic disk devices 104-1 to 104-5 are disposed under a controller 100 as storage devices, and every one of the magnetic disk devices 104-1 to 1042-5 has respective replicated data 102-1 to 102-5 with respect to original data 102 which is composed of data blocks A to H. RAID 5 is a method in which data is recorded in a manner that it is distributed to a plurality of disks, wherein, upon writing, a redundant code called parity obtained by addition of data is generated and written at the same time. Accordingly, even if any one of the disks fails, the original complete data can be restored from the data and parity information of the disks other than that.

FIG. 2 shows a storage system to which RAID 5 is applied. For example, the five magnetic disk devices 104-1 to 104-5 are disposed as storage devices under the controller 100.

With respect to the data blocks A to H of the original data 102, a parity $P_{ABCD}$ is calculated from exclusive OR of the data blocks A to D, and they are stored in the magnetic disk devices 104-1 to 104-5; and, subsequently, a parity $P_{EFGH}$ is calculated from exclusive OR of the data blocks E to H, and they are stored in the magnetic disk devices 104-1 to 104-5. The parities $P_{ABCD}$ and $P_{EFGH}$ are stored in different devices such as in the magnetic disk device 104-5 and 104-4, respectively. In RAID 5, the capacity of disks required for recording the parities is a capacity corresponding to one disk regardless of the number of the disks; therefore, utilization efficiency is high compared with RAID 1. RAID 6 is an extended version of RAID 5, wherein two pieces of parity are generated which is one in RAID 5. Accordingly, even if two magnetic disk devices fail at the same time, the original data can be restored in this method. Although there are several methods for obtaining the second parity, the Read Solomon code is generally employed.

FIG. 3 shows a storage system to which RAID 6 is applied, wherein, for example, the data blocks A to C are stored in the magnetic disk devices 104-1 to 104-3 by the controller 100, a parity $P_{ABC}$ is calculated from exclusive OR of the data blocks A to C and stored in the magnetic disk device 104-4. Furthermore, a second parity Q1 is calculated from the data of the data blocks A to BC and the parity $P_{ABC}$ by use of Read Solomon code and stored in the magnetic disk device 104-5. As described above, since one parity is increased in RAID 6 compared with RAID 5, original data can be recovered even when two units in a storage system fail at the same time. However, since two parities are generated, utilization efficiency is lower than RAID 5 by an amount corresponding to one disk, and there is also a problem that the calculation amount is large since Read Solomon code is used for obtaining the second parity. Moreover, as a conventional file control method of a storage system, there is a method for controlling a file by changing the RAID level in accordance with the file size (JP 3505093 1). In this method, in the case of a file which is less than one block, it is stored by the redundancy method of the RAID level 1; and, if it is two blocks or more, it is stored by the redundancy method of the RAID level 5.

Furthermore, as a method for correcting a storage system data rows, there is a method in which, when two data DASDs are defective, data thereof is generated again as functions of a pair of syndromes constituting two pool equations of unknown values (JP 05-197579). In this method, reproduction of data is facilitated and load of writing process of the entire rows is balanced by storing a matrix of powers of polynomial expressions of code primitive and performing pipeline processing.

However, such storage systems for ensuring redundancy of data by applying conventional RAID have the following problems. First of all, copy of the original data is generated in each magnetic disk device in mirroring of RAID 1; therefore, there is a problem that, although failure tolerance is high, the utilization efficiency of the disks is extremely bad. Moreover, although the utilization efficiency of the disks is high in RAID 5 compared with RAID 1, a restorable case is merely when one disk fails, and restoration is impossible when two or more units thereof fail at the same time. Furthermore, RAID 6 has problems that the utilization efficiency is lower than RAID 5 by an amount corresponding to one disk since two parities are generated. Moreover, values used as indications of failure rates of magnetic disks include mean failure interval MTBF (Mean Time Between Failures, wherein unit is time). The mean failure interval MTBF represents mean time from recovery of a product until next failure is generated. For example, when the mean failure interval MTBF is 400,000 hours, one disk is broken after 400,000 hours. When 10 magnetic disk devices are simultaneously used in RAID or the like, one of them fails in 40,000 hours. Since all the magnetic disk devices are treated equivalently in RAID, magnetic disk devices having the same performance have to be used as much as possible; however, the mean failure interval MTBF of the magnetic disk devices is reduced more and more along with time, and, if a particular magnetic disk device is replaced, the difference with the replaced magnetic disk device increases. When such a situation is caused, there is a problem that reliability of RAID is largely reduced.

SUMMARY OF THE INVENTION

According to the present invention to provide an object of the present invention is to provide a storage system having high decodability against failure of a case in which two or more pieces of data distributed to and stored in a plurality of storage devices are defective, a control method, and a program.

(System)

The present invention provides a storage system. The present invention is a storage system having a storage apparatus composed of a plurality of storage devices, characterized by having an encoding unit for, after dividing original data, generating a plurality of encoded data equal to or more than the division number by use of a code of which redundancy is variable;

a redundancy control unit for varying the redundancy in the encoding unit;

a distribution processing unit for distributing the plurality of encoded data to the plurality of storage devices and causing the encoded data to be stored in the storage devices; and a decoding unit for retrieving the encoded data corresponding to at least the division number of the original data from the storage devices and decoding the original data.

Herein, the encoding unit has a block dividing unit for dividing the original data into n-units of block data, and an encoded data generating unit for generating, merely by a number m according to redundancy Q. headers, in each of which a bitmap specifying one or a plurality of blocks for obtaining exclusive OR in the n-units of block data is disposed, and encoded data comprised of exclusive OR data of the one or plurality of block data specified by the header part; wherein the decoding unit retrieves the block number n or more of the encoded data from the plurality of storage devices, and converts the header into a unit matrix by means of, for example, the Gaussian elimination method so as to decode the n-units of block data.

The redundancy control unit varies the redundancy in the encoding unit in accordance with importance of the original data. In the redundancy control unit, the importance of the original data is manually set or automatically set in accordance with a keyword contained in the original data, update date and time, or update frequency. As the automatic setting of the importance, the redundancy control unit sets importance corresponding to the keyword contained in the original data, and then, corrects the importance in accordance with the update date and time and/or the update frequency.

The distribution processing unit determines the distribution number of the plurality of encoded data in accordance with reliability and/or usable capacity of the plurality of storage devices. In the distribution processing unit, the reliability of the storage device is manually set or automatically set based on operating time. The distribution processing unit sets the importance of the storage device in accordance with the operating time, and then, corrects the importance in accordance with a usable capacity of the storage device.

When the storage device is newly added or eliminated, based on the storage devices after the change, the encoded data is regenerated in the encoding unit, and then, the encoded data is redistributed by the distribution processing unit.

(Method)

The present invention provides a control method of a storage system. The present invention is a control method of a control method of a storage system having a storage apparatus composed of a plurality of storage devices, characterized by having an encoding step of, after dividing original data, generating a plurality of encoded data equal to or more than the division number by use of a code of which redundancy is variable;

a redundancy control step of varying the redundancy in the encoding step;

a distribution processing step of distributing the plurality of encoded data to the plurality of storage devices and causing the encoded data to be stored in the storage devices; and a decoding step of retrieving the encoded data corresponding to at least the division number of the original data from the storage devices and decoding the original data.

(Program)

The present invention provides a storage control program. The storage control program of the present invention is characterized by causing a computer of a storage system having a plurality of storage devices for distributing and storing original data, to execute an encoding step of, after dividing original data, generating a plurality of encoded data equal to or more than the division number by use of a code of which redundancy is variable;

a redundancy control step of varying the redundancy in the encoding step;

a distribution processing step of distributing the plurality of encoded data to the plurality of storage devices and causing the encoded data to be stored in the storage devices; and a decoding step of retrieving the encoded data corresponding to at least the division number of the original data from the storage devices and decoding the original data.

According to the present invention, while maintaining equivalent reliability compared with conventional RAID, utilization efficiency of a plurality of storage devices constituting storage such as magnetic disk devices can be improved. For example, since data amounts to be distributed to the storage devices are variable, a storage apparatus can be composed by combining high-performance storage devices and low-performance storage devices together, and, compared with conventional systems which required storage devices of the same performance, a highly-redundant storage system in which data can be restored even when two or more pieces of the data are defective can be built at low cost. Moreover, in the present invention, in order to enable data restoration even when one or more storage devices fail at the same time, encoded data in which redundant data with respect to the data is added by an encoding method in which the redundancy (encoding rate) is variable is generated, and distributed to and stored in a plurality of storage devices. Even when failure occurs at the same time in the plurality of storage devices, as long as the number of the encoded data required for restoration can be retrieved from the rest of the storage devices, the original data can be restored, and reliability of the storage system can be improved. Moreover, in the present invention, when the data is to be encoded, the redundancy rate of important data is increased, and the redundancy rate of data that is not really important is lowered. Consequently, compared with a case in which the redundancy rate is fixed, the encoded data can be efficiently distributed and allocated to the storage devices, and decoding of the original data can be performed without increasing the number of encoded data beyond necessity. Moreover, in the present invention, the number of encoded data to be distributed to the plurality of storage devices is determined in accordance with the reliability of respective storage devices. The higher the reliability, the more the encoded data is distributed; and, when the reliability is low, the number of distributed data is reduced. Consequently, lost of the encoded data due to failure of the storage devices can be suppressed to a minimum level, the number of encoded data required for restoration of the original data can be stably retrieved, and the redundancy rate of the data can be suppressed while ensuring high reliability. Moreover, when the encoded data is to be distributed to the plurality of storage devices, the number of distributed data is dynamically determined in accordance with, for example, operating time or the usable capacity of each storage device; thus, the reliability upon failure can be further improved. Furthermore, since the number of the encoded data (data amount) to be distributed to the storage devices is variable, high-performance storage devices and low-performance devices, or storage devices having large usable capacities and storage devices having small capacities thereof can be used together in combination, the utilization efficiency of the storage devices can be increased, and a storage system can be built at low cost compared with conventional systems that needed storage devices of the same performance. The above and other objects, features, and advantages of the present invention will become more apparent from the following detailed description with reference to the drawings.

BRIEF DESCRIPTION OF THE DRAWINGS

FIGS. 9A to 9C are explanatory diagrams of the importance control table of FIG. 4;

FIG. 10 is an explanatory diagram of an allocation process in which encoded data is allocated to magnetic disk devices in accordance with reliability;

FIG. 11 is an explanatory diagram of the distribution control table of FIG. 4;

DETAILED DESCRIPTION OF THE PREFERRED EMBODIMENTS

Figure 1:
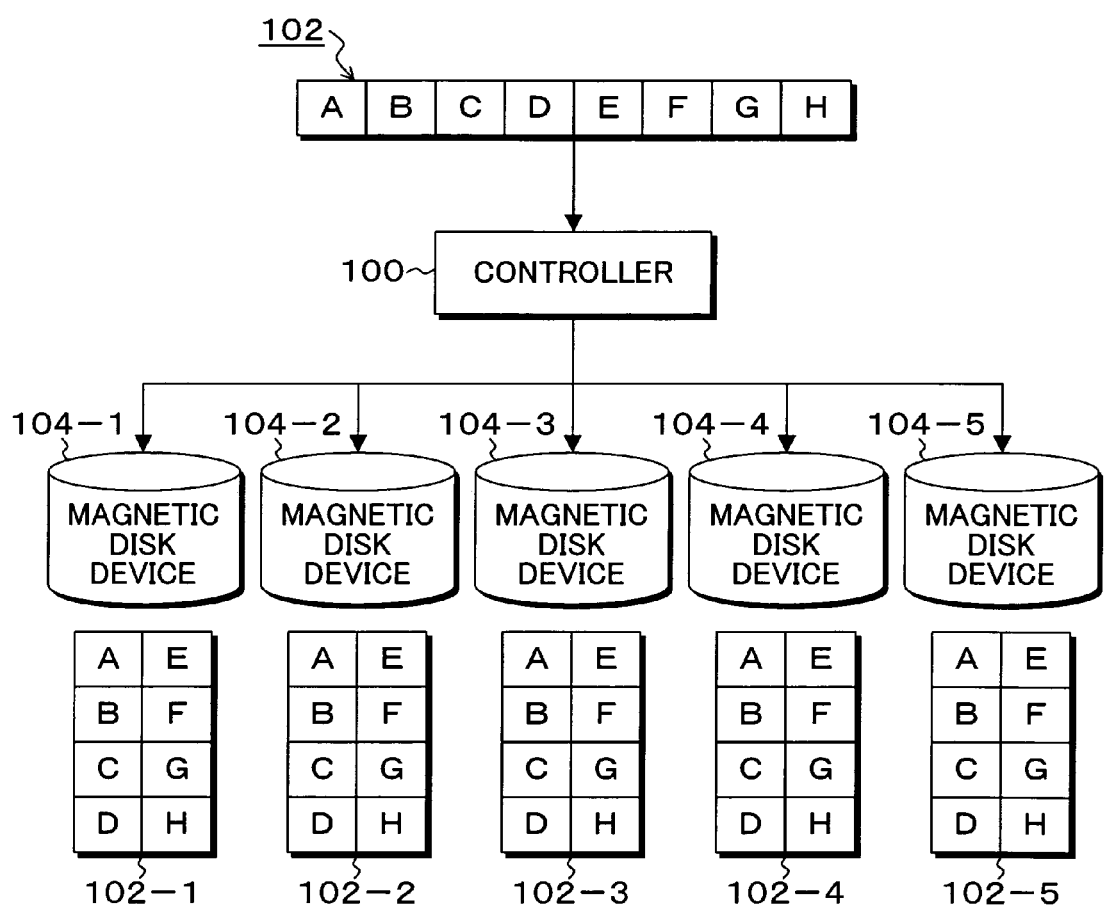
FIG. 1 is an explanatory diagram of a conventional distributed storage employing RAID 1.
Figure 2:
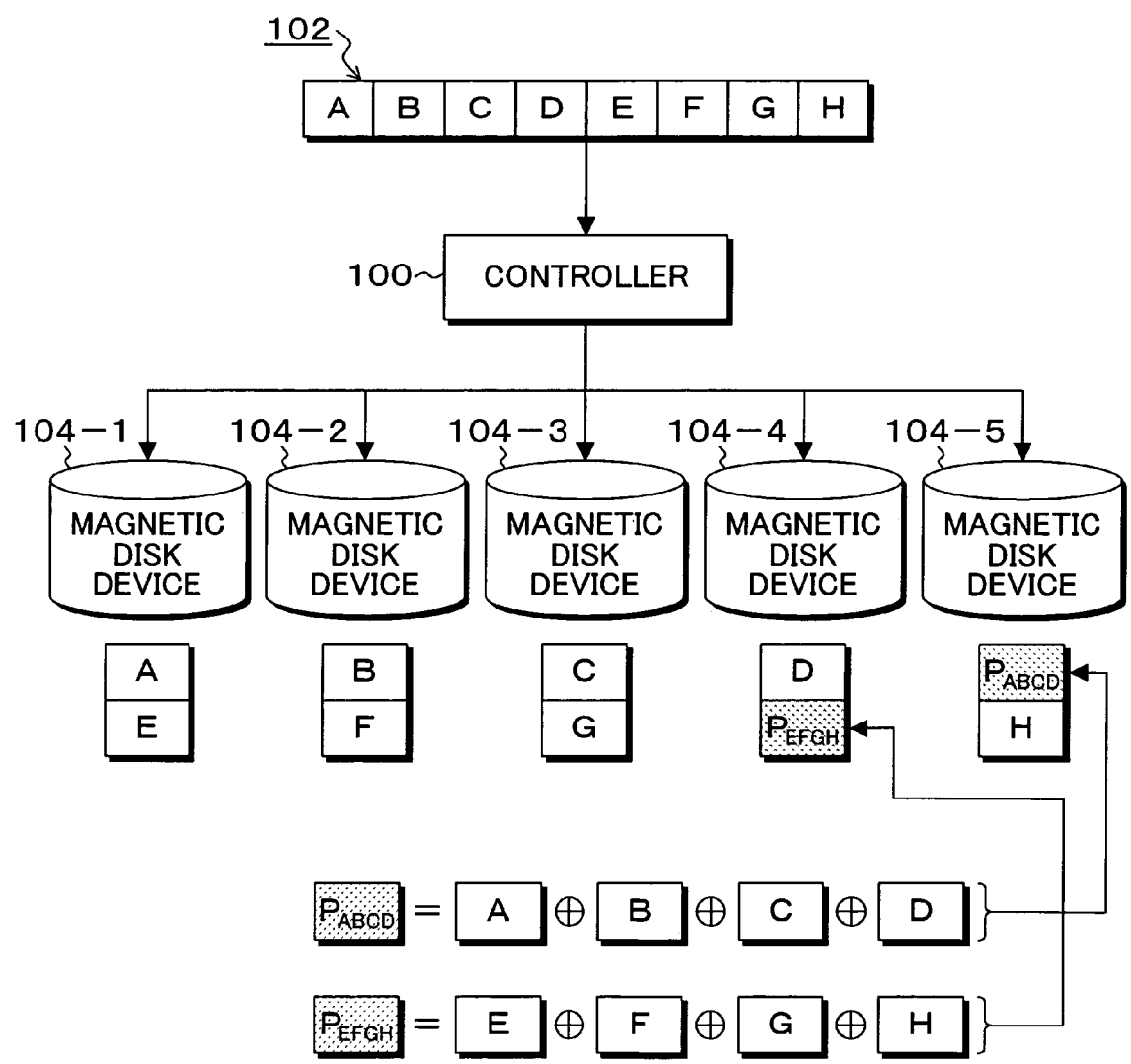
FIG. 2 is an explanatory diagram of a conventional distributed storage employing RAID 5.
Figure 3:
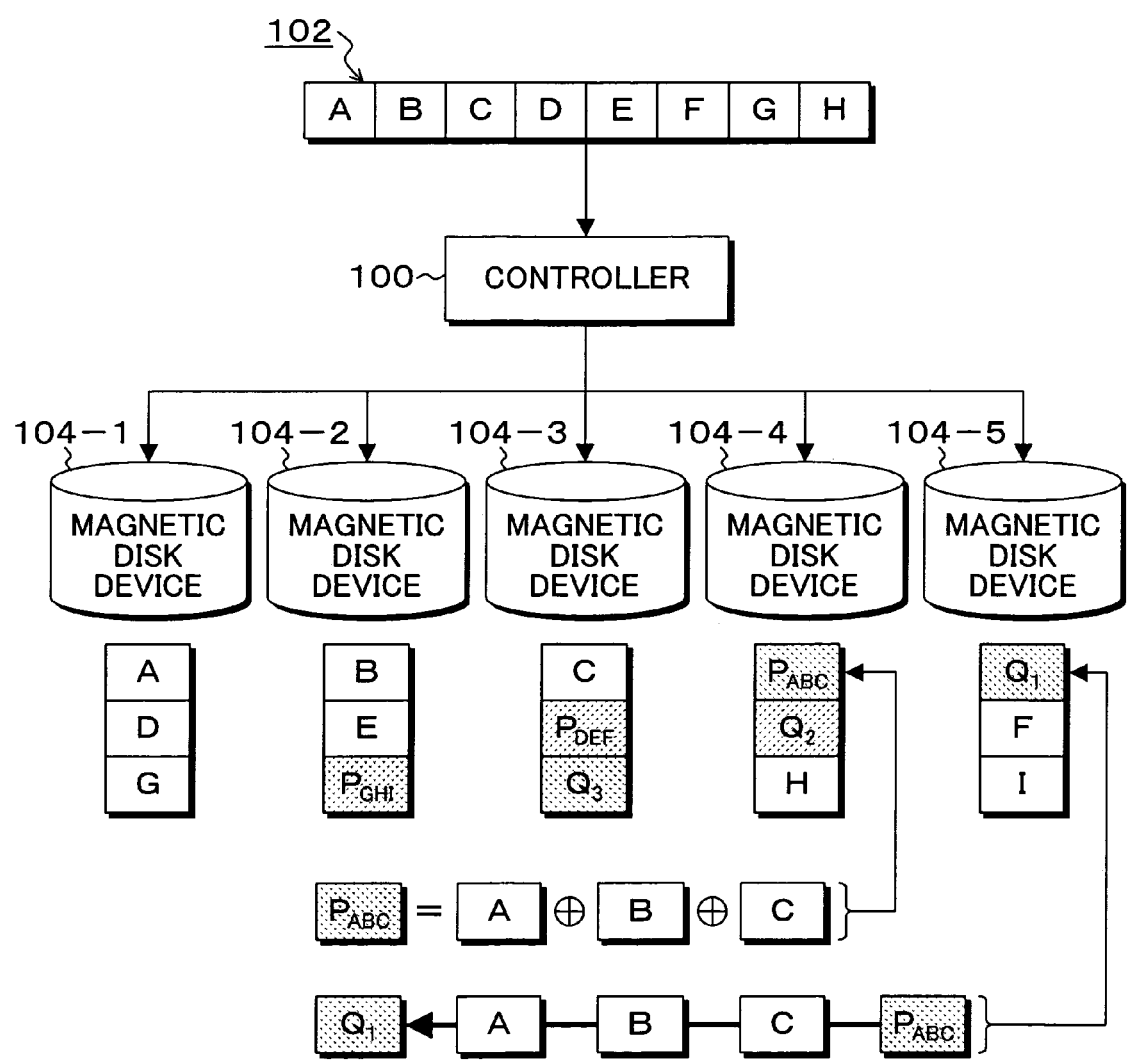
FIG. 3 is an explanatory diagram of conventional distributed storage employing RAID 6.
Figure 4:
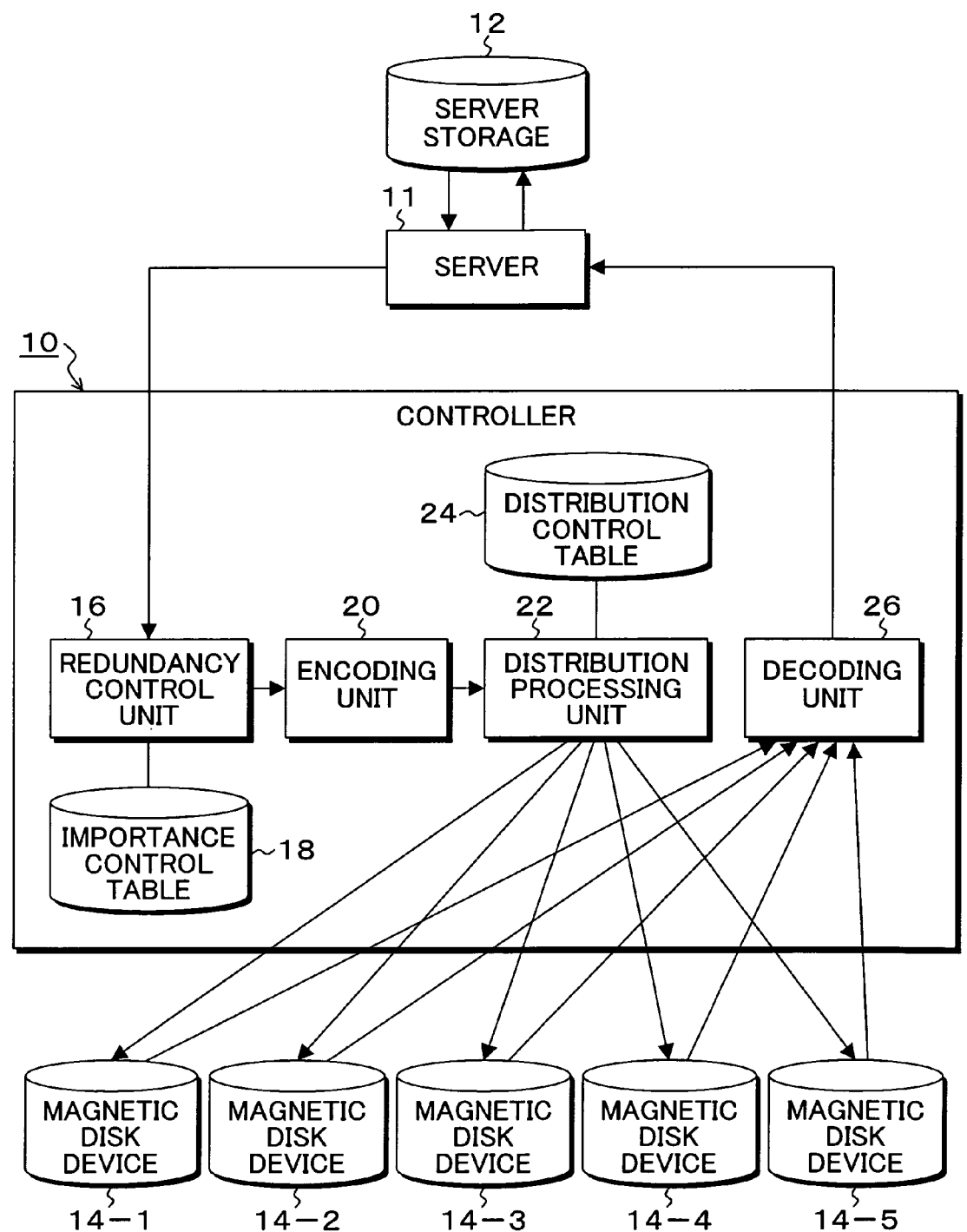
FIG. 4 is a block diagram of a functional configuration of a storage system of the present invention.

FIG. 4 is a block diagram of a functional configuration showing an embodiment of a storage system according to the present invention. In FIG. 4, the storage system of the present embodiment is composed of a controller 10 and magnetic disk devices 14-1 to 14-5 which function as a plurality of storage devices. A server 11 is disposed as a higher-level device with respect to the controller 10, and the controller 10 controls writing and reading of data of a server storage 12 with respect to the magnetic disk devices 14-1 to 14-5. When the controller 10 receives a file write request from the server 11 according to a write command, it converts a file which is received subsequent to the command as original data into encoded data by use of a code of which redundancy is variable, and then, distributes it to the magnetic disk devices 14-1 to 14-5 such that it is distributed and stored therein. When the controller 10 receives a file read request from the server 11 according to a read command, it accesses the magnetic disk devices 14-1 to 14-5, and retrieves the distributed and stored encoded data so as to decode the original file. In the controller 10, an encoding unit 20, a redundancy control unit 16, an importance control table 18, a distribution processing unit 22, a distribution control table 24, and a decoding unit 26 are provided. Among these, fundamental functions of the controller 10 are comprised of the encoding unit 20, the distribution processing unit 22, and the decoding unit 26. The encoding unit 20 divides the file serving as the original data of the user received from the server 11 into block data of a predetermined block number n, then, each block data is converted into a code of which redundancy is variable, more specifically, a Random Parity Stream code (RPS code) which is elucidated in the following description and comprised of a header and exclusive OR data (XOR data), and plural units of encoded data equal to or more than the number of divided blocks are generated. The distribution processing unit 22 distributes the plurality units of encoded data generated in the encoding unit 20 to the magnetic disk devices 14-1 to 14-5 such that they are stored therein. The decoding unit 26 retrieves the encoded data corresponding to at least the number of divided blocks of the file serving as the original data from the magnetic disk devices 14-1 to 14-5, and decodes the original file. Herein, the redundancy control unit 16 varies the redundancy of encoding processes in the encoding unit 20. The redundancy can be represented by Redundancy $Q=m/n$ wherein the block division-number of the original data is n, the number of the units of the encoded data generated by the Random Parity Stream code is m. The redundancy Q is the reciprocal of an encoding rate R. Thus, the encoding rate R can be represented by Encoding rate $R=n/m=1Q$.

Herein, the redundancy Q is a value of one or more, while the encoding rate R is a value between 1 and 0. Therefore, in the encoding unit 20, based on the redundancy Q set by the redundancy control unit 16, m-units of encoded data according to the redundancy Q are generated from n-units of the block data of the file which is divided as the original data. Furthermore, the redundancy control unit 16 varies the redundancy Q in the encoding unit 20 in accordance with the importance of the file serving as the original data. More specifically, the higher the importance of the file, the more the redundancy Q is increased; and the lower the importance of the file the more the redundancy is reduced. In determination of the importance of the file, for example, a keyword contained in the file can be used. Moreover, in addition to the keyword, the update date and time or update frequency of the file can be used for the importance. Moreover, in the distribution processing unit 22, the distribution number of the encoded data with respect to the magnetic disk devices 14-1 to 14-5 can be determined in accordance with the reliability of the magnetic disk devices 14-1 to 14-5. More specifically, distribution is performed such that the higher the reliability of the magnetic disk device, the more the distribution number of the encoded data is increased; and the lower the reliability, the more the distribution number of the encoded data is reduced. The reliability of the magnetic disk devices 14-1 to 14-5 can be manually set or automatically set based on the operating time. For example, in automatic setting of the reliability of the magnetic disk device, first, the reliability is determined from the operating rate, and then, a process of correcting the value thereof is performed in accordance with the operating time. Furthermore, the distribution number of the encoded data can be determined in accordance with the reliability and the usable capacity of the magnetic disk device. When the Random Parity Stream code is used as the code of which redundancy is variable, the decoding unit 26 retrieves at least the divided block number n or more of the encoded data from the magnetic disk devices 14-1 to 14-5, and converts the headers into a unit matrix by means of the Gaussian elimination method, thereby decoding the n units of block data.

Figure 5:
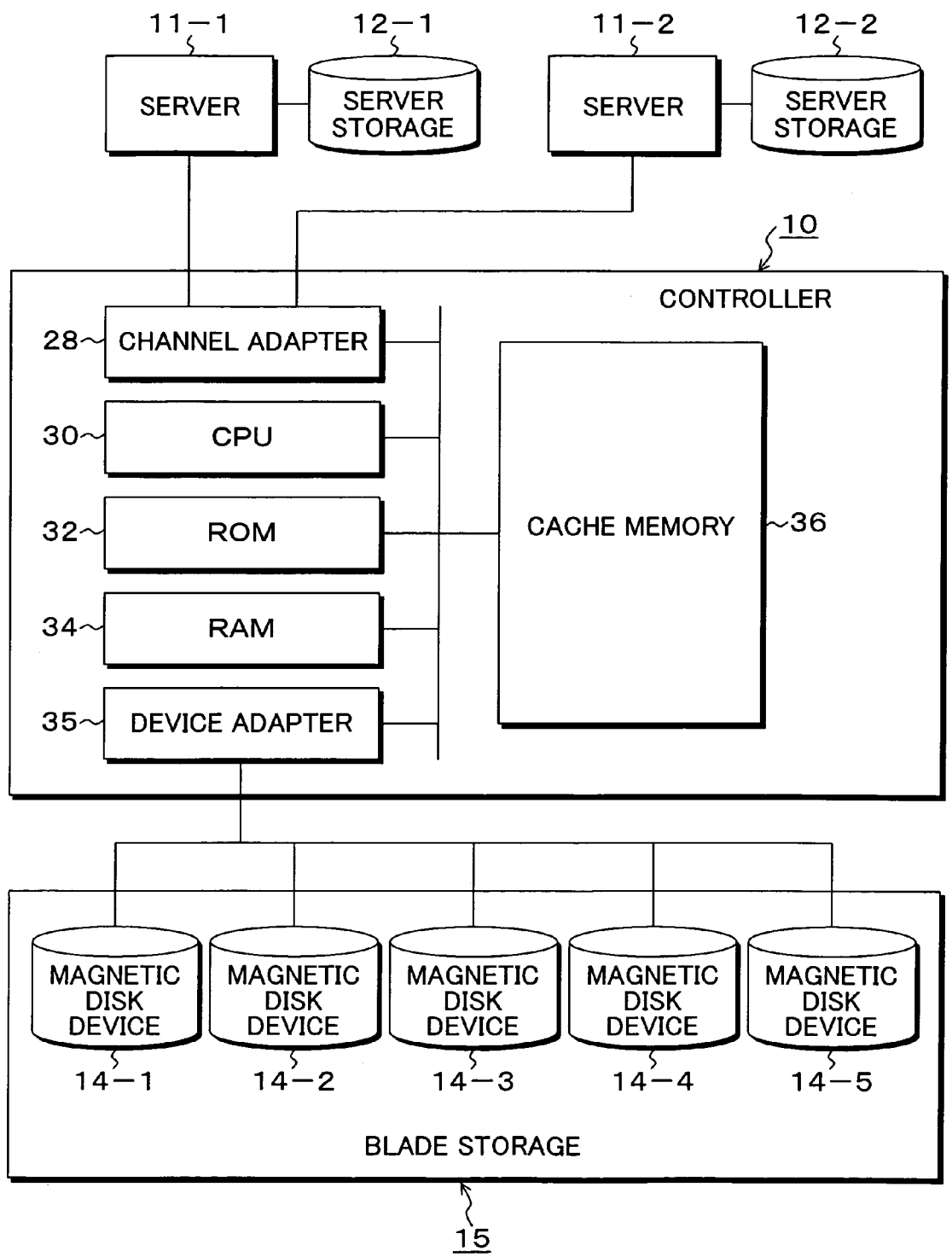
FIG. 5 is a block diagram of a hardware environment which realizes the storage system of FIG. 4.

FIG. 5 is a block diagram of a hardware environment of a storage system to which the embodiment of FIG. 4 is applied. In the controller 10, a channel adapter 28, a CPU 30, a ROM 32, a RAM 34, a device adapter 35, and a cache memory 36 are provided. For example, servers 11-1 and 11-2 serving as upper-level devices are connected to the channel adapter 28, and server storages 12-1 and 12-2 are provided in the servers 11-1 and 11-2, respectively. The CPU 30 realizes the functions shown in the controller 10 of FIG. 4 by deploying a storage system control program according to the present embodiment stored in the ROM 32 to a RAM 34 and executing it. The RAM 34 is further used as a data buffer so as to retain and encode a file which is transferred from the servers 11-1 and 11-2 side and serving as original data to be written, and is also used as a work region when data retrieved from the magnetic disk devices 14-1 to 14-5 is retained and decoded. The magnetic disk devices 14-1 to 14-5 which function as storage devices are connected to the device adapter 35. The magnetic disk devices 14-1 to 14-5 are built as, for example, blade storage, and the magnetic disk devices 14-1 to 14-5 are attachably/detachably mounted in a rack of a chassis. The five magnetic disk devices 14-1 to 14-5 are taken as an example in the present embodiment in order to simplify the description; however, in an actual system storage, when a number of magnetic devices are mounted, a large storage capacity of, for example, petabyte size can be realized. The blade storage 15 can be said that it is a kind of a disk array. Cache data based on cache control of the CPU 30 is stored and controlled in the cache memory 36. Distributed storage of encoded data which is obtained by encoding a file serving as original data in the present embodiment and decoding of retrieved encoded data is executed as processes of the side of the device adapter 35 which is a lower level viewed from the cache control.

Figure 6:
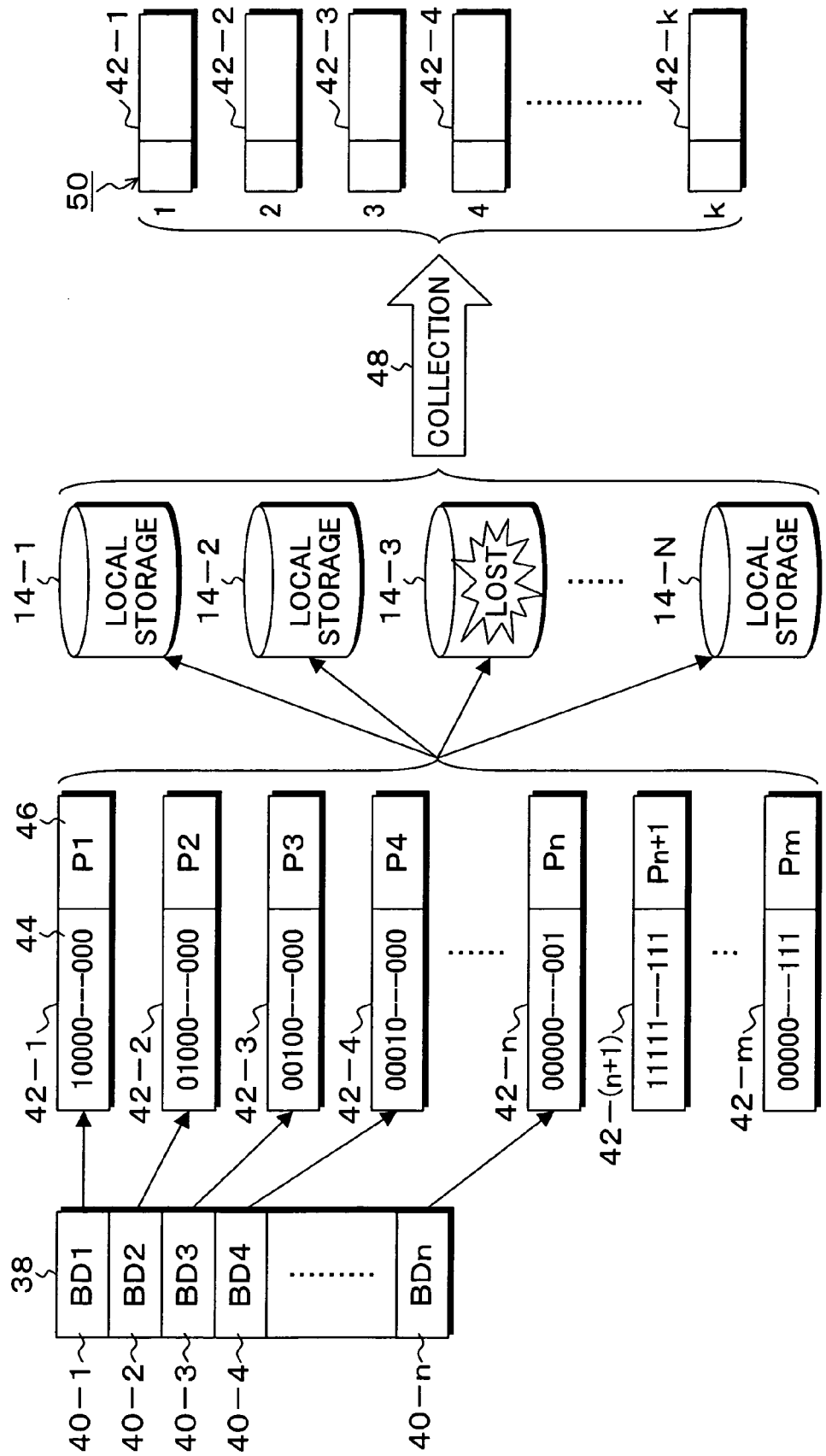
FIG. 6 is an explanatory diagram of an encoding process, a distribution process, and a retrieval process for decoding according to the present invention.
Figure 7:
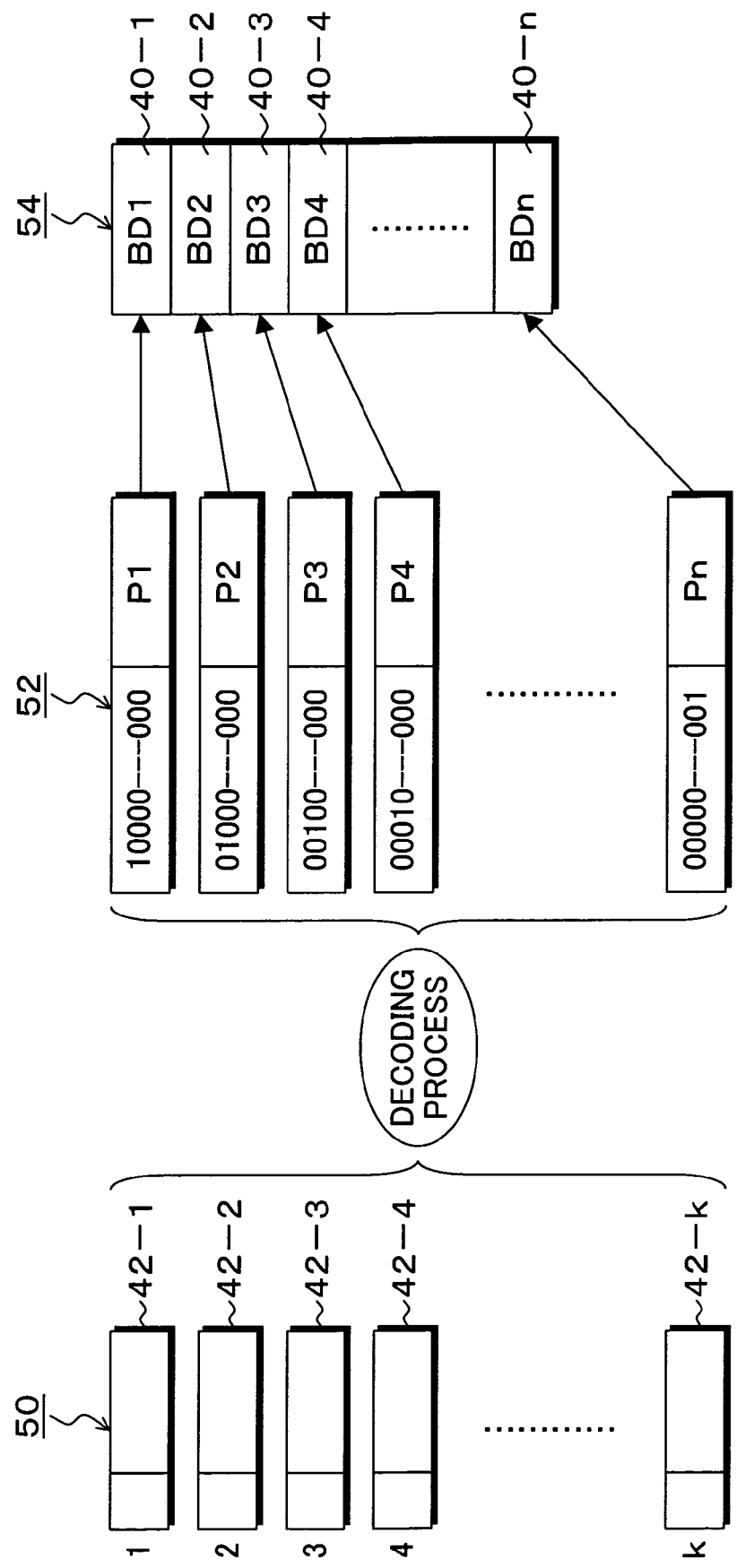
FIG. 7 is an explanatory diagram of a decoding process subsequent to the retrieval process of FIG. 6.

FIG. 6 is an explanatory diagram of an encoding process, a distribution process, and a retrieval process for decoding according to the present invention, and FIG. 7 further shows a decoding process subsequent to the retrieval process of FIG. 6. In the present invention, the Random Parity Stream code (RPS code) is used as the code of which redundancy Q is variable in the encoding unit 20 of FIG. 4. The Random Parity Stream code has a calculation amount which is smaller than that of the Read Solomon code used in RAID 6, and can dynamically change the redundancy Q; therefore, the storage system for distributing and allocating data to a plurality of magnetic disk devices can be flexibly built. In encoding of the Random Parity Stream code used in the present invention, as shown in FIG. 6, the file serving as original data 38 is divided into the predetermined block number n, thereby generating block data 40-1 to 40-n. In an actual system, for example, the divided block number n=1028 and block size=1280 bytes are fixedly set, and a user file serving as the original data 38 is divided wherein the file capacity determined by the divided block number n and the block size serves as a maximum capacity. When the user file is smaller than the maximum size of the original data, dummy data is put into the open part, thereby generating a constant divided block number n of block data. The block data 40-1 to 40-n which has been divided from the original data 38 into the divided block number n is comprised of headers 44 and XOR data 46, and converted into encoded data 42-1 to 42-m of m-units determined by the redundancy Q. When the encoded data 42-1 is taken as an example, the header 44 is n-bit bitmap data showing the position of the block data 40-1 to 40-n divided in the original data 38 and used for calculating the XOR data 46. For example, the header 44 of the encoded data 42-1 is "10000 . . . 000", wherein merely one bit at the left end is "1", and all the rest is "0". In the XOR data 46, one or plural corresponding units of block data is selected from the original data 38 in accordance with the bitmap of the header 44 to calculate exclusive OR (XOR), and data P1 is calculated and stored as the XOR data 46. In the present embodiment, in the encoded data 42-1 to 42-n corresponding to the n-units of block data 40-1 to 40-n, the bit showing the position of the corresponding block data is "1", and all the rest is "0" in each header 44; as a result, merely one block data is used in the XOR calculation by virtue of the header 44. Therefore, P1, P2, P3, P4, . . . Pn in the XOR data 46 is the data same as the block data BD1, BD2, BD3, BD4, . . . BDn, that is, the block data per se. Meanwhile, in the rest, encoded data 42-(n+1) to 42-m exceeding the divided block number n, bit "1" is set in the header 44 thereof for specifying two or more blocks for XOR calculation, and the bitmap in the header 44 is, for example, randomly generated. Moreover, as the bitmaps of the headers 44 in the encoded data 42-(n+1) to 42-m, numerical values which can be readily converted into a unit matrix in the decoding process which is elucidated in the following description are desired to be used, and such numerical values are, for example,

1111 . . . 111
0101 . . . 101
1010 . . . 010
0000 . . . 111
1111 . . . 000.

The m-units of encoded data 42-1 to 42-m generated in the encoding process are distributed to and disposed in the magnetic disk devices 14-1 to 14-N uniformly or in accordance with the reliability, and stored therein. In decoding based on the encoded data distributed to and stored in the magnetic disk devices 14-1 to 14-N, retrieval 48 of the encoded data is performed so as to obtain encoded data 42-1 to 42-k as retrieved data 50, and, as shown in FIG. 7, the original block data 40-1 to 40-n can be decoded as decoded data 54 from the k-units of encoded data.

In the decoding process in FIG. 7, a process of conversion into a unit matrix 52 by means of the Gaussian elimination method with respect to the headers 44 in the k-units of encoded data 42-1 to 42-k obtained as the retrieved data 50 is performed, thereby decoding the block data 40-1 to 40-n as the original block data BD1 to BDn from the values P1 to Pn corresponding to the XOR data 46 added to them.

Figure 8:
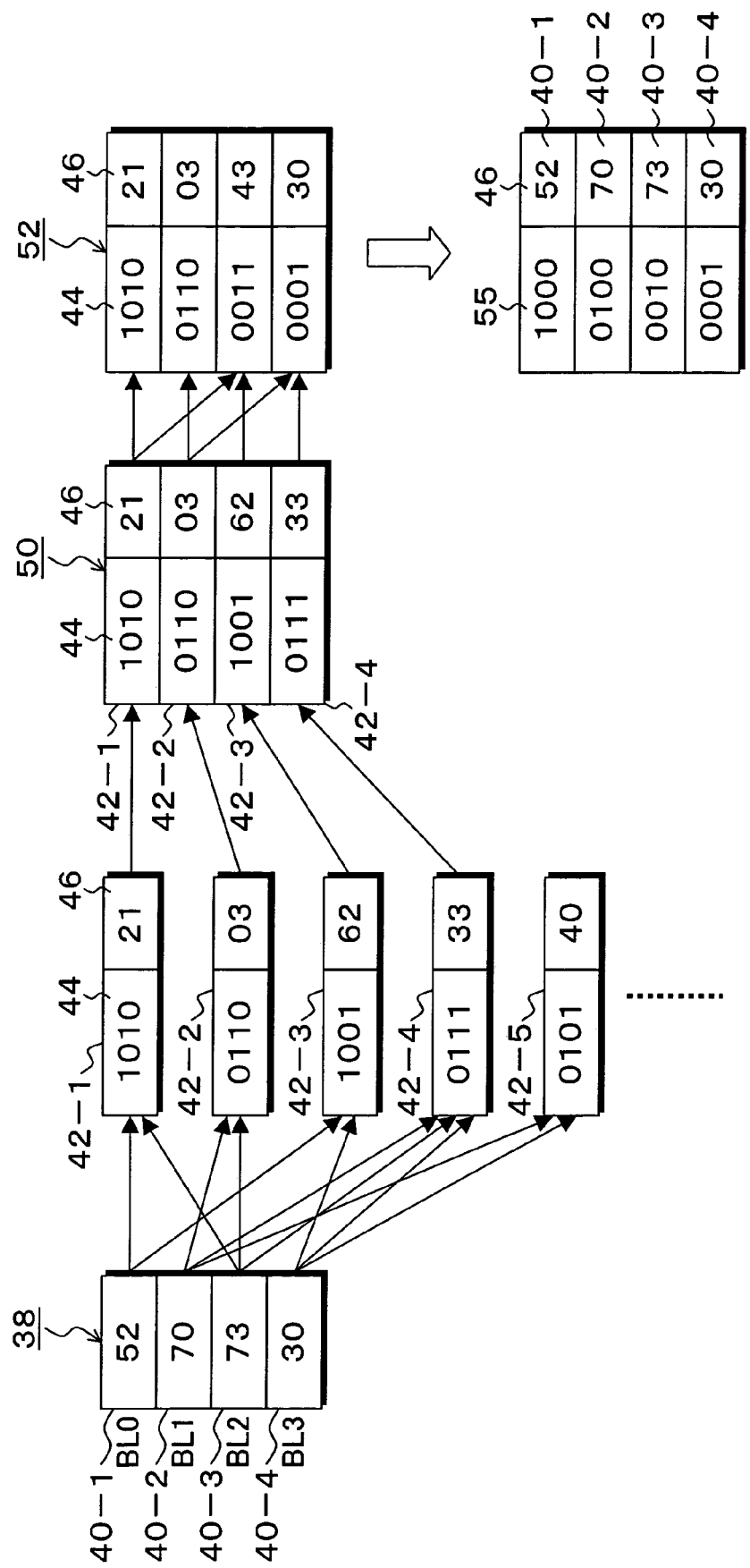
FIG. 8 is a specific explanatory diagram of the encoding process and the decoding process according to the present invention.

FIG. 8 is specifically showing an encoding process, a distribution process, and a decoding process according to the present invention. In FIG. 8, the original data 38 is divided into, for example, two-byte block data 40-1 to 40-4. The block data 40-1 to 40-4 are, in hexadecimal, for example, "52", "70", "73", and "30". Subsequently, encoding is performed to convert it into m-units of the encoded data 42-1, 42-2, 42-3, 42-4, 42-5, . . . determined by the redundancy Q. When the encoded data 42-1 is taken as an example, the encoded data 42-1 is composed of the header 44 and the XOR data 46, wherein the header 44 is four-bit bitmap data representing the position of the divided block data 40-1 to 40-n in the original data 38 to be used for calculating the XOR data 46. The header 44 of the encoded data 42-1 is "1010", and exclusive OR (XOR) is obtained in hexadecimal calculation, "52(+) 73=21" by selecting corresponding first and the third block data 40-1 and 40-3 from the original data 38 in accordance with the bitmap of the header 44, thereby obtaining "21" as the XOR data 46. The thus converted encoded data 42-1, 42-2, 42-3, 42-4, 42-5 ... is distributed and stored in the plurality of magnetic disk devices. When a read request is received thereafter, four units of encoded data 42-1 to 42-4 are read as the retrieved data 50 which is required for decoding. In the decoding process, a unit matrix 55 is obtained by performing the process of conversion into a unit matrix 52 by means of the Gaussian elimination method with respect to the header 44 of the four units of encoded data 42-1 to 42-4 obtained as the retrieved data 50, thereby decoding "52", "70", "73", and "30" which are values of the original block data 40-1 to 40-4 from the XOR data 46 added to the unit matrix 55. At this point, during the decoding process of FIG. 7, even when the encoded data is lost due to failure in, for example, the magnetic disk device 14-3 among the magnetic disk devices 14-1 to 14-N as shown in FIG. 6, when the inverse matrix of the headers can be obtained in the decoding side through the conversion into a unit matrix 52 as shown in FIG. 7, the original block data 40-1 to 40-n can be decoded. More specifically, in distributed storage of data using the Random Parity Stream code of the present invention and in decoding which is started when part of data is lost, the m-units of encoded data is generated in accordance with the redundancy Q so as to be excessive about several percent the division n of the block data 40-1 to 40-n of the original data 38, and these are distributed and stored; consequently, when the number of the encoded data required for decoding the original data is k, as long as k-units of the encoded data can be collected in total from the rest, i.e., the normal magnetic disk devices, the original data can be decoded, even when two or more of the magnetic disk devices fail. Therefore, in the present invention, a dynamic redundancy (encoding rate) determination process is performed in accordance with the importance of the data distributed to and stored in the magnetic disk devices. The number k of the encoded data with which the original data can be decoded by use of the Random Parity Stream code is changed in accordance with the number m of the generated encoded data; therefore, safety of the data upon occurrence of failure is also changed. The more the number m of the encoded data, the more the redundancy Q is increased; wherein although the total capacity of the magnetic disk devices required for the distributed storage is increased, the original data can be decoded more reliably. In other words, tolerance against failure of the magnetic disk devices can be adjusted by the number m of the encoded data. The redundancy Q of encoding in the Random Parity Stream code can be changed for each file which is to be distributed and stored; therefore the redundancy Q is controlled to be changed in accordance with the importance of the file serving as the original data. More specifically, the redundancy Q can be increased for an important file so as to increase the tolerance against failure, and the redundancy Q can be reduced for a file which is not important that much so as to lower the tolerance of the magnetic disk device against failure, thereby reducing the required capacity of the magnetic disk devices. Specifically, respectively for the files serving as the original data, V1 to Vn is determined in advance as the levels of importance, and, in accordance with predetermined importance Vi, the number m of generated encoded data is determined by the following expression.

$$m = F(V_i) \quad (1)$$

The importance Vi for obtaining the number m of the encoded data according to this expression (1) can be determined by manual setting performed by the user or automatic setting. In the automatic setting of the importance, for example, keywords are registered to correspond to files for determining the importance of the files, and, upon encoding of the file, the keyword that the file has and the keywords registered in advance are compared with each other. When a corresponding keyword is contained in the file, the importance which has been set in advance is set in accordance with the keyword. In this case, when the automatically determined importance is largely different from the importance automatically set by the user, the automatically set importance may be displayed to the user such that the user can select either one. Furthermore, as a parameter for determining the importance of the file, the last update date, access frequency, etc. of the file can be also used. Regarding the update date and the access frequency of the file, the importance may be independently set and prepared, for example, in accordance with table information, or, for example, the importance determined based on the keyword may be corrected based on the last update date, access frequency, etc. The number m of the encoded data which is set in accordance with the importance of the original data means to change the redundancy Q (=m/n), and the range of the redundancy Q which is changed in accordance with the importance is, as a practical range, for example, about 1.1 to 1.5 since, when the redundancy is increased to much, the data amount to be distributed to and stored in the magnetic disk devices is increased and the utilization efficiency is lowered.

FIGS. 9A to 9C are explanatory diagrams of the importance control table 18 of FIG. 4 which controls the importance of the file used in calculation of the encoded data number n. An importance control table 18-1 of FIG. 9A is comprised of keywords 76 and importance 78, and any of the keywords W1 to W5 representing importance is stored in each file. Therefore, when the file is to be encoded, any of the keywords corresponding to the file is extracted, and the importance control table 18-1 is referenced so as to set the corresponding importance. An importance control table 18-2 of FIG. 9 B is comprised of last update dates 80 and the importance 78 of files; and, for example, current day, less than 3 days, less than 1 week, less than 1 month, less than 3 months, etc. are set as the last update dates 80, and the importance V1 to V5 is accordingly set. The more recent the last update date, the higher value the importance 78 has in the last update date 80. An importance control table 18-3 of FIG. 9C is comprised of update frequency 82 and the importance 78; wherein the range of predetermined update frequency is set separately in five levels as the update frequency 82, and, the higher the update frequency, the higher the value set as the importance 78. Regarding the importance control table 18-1, 18-2, and 18-3 shown in FIGS. 9A, 9B, and 9C, the importance may be set by independently using them. Alternatively, for example, a method in which, after the importance 78 is determined in accordance with the keyword 76 of the file by use of the importance control table 18-1 of FIG. 9A, the value of the importance 78 set in accordance with the keyword 76 is corrected to be increased if the last update date is recent or is corrected to be reduced if the last update date is old, and, in accordance with the update frequency of the file, the importance is corrected to be increased if the update frequency is high or is corrected to be reduced if the update frequency is low may be employed. The distribution process of the encoded data in the distribution processing unit 22 of FIG. 4 in accordance with the reliability of the magnetic disk devices 14-1 to 14-5 will next be described. In conventional RAID and mirroring, magnetic disk devices having the same capacity are required for forming a storage system.

Furthermore, in order to reliably save data, all the magnetic disk devices are desired to have equivalent performance. On the other hand, in the present embodiment, merely retrieving k-units or more of the encoded data from the magnetic disk devices 14-1 to 14-5 is required for restoring the original data, and the number of units of the encoded data that each of the magnetic disk devices 14-1 to 14-5 has does not matter. Therefore, in the distribution process of the encoded data of the present embodiment, when the encoded data is to be distributed to the magnetic disk devices 14-1 to 14-5, more encoded data is distributed to and saved in highly-reliable magnetic disk devices, and less encoded data is distributed and saved in less-reliable magnetic disk devices.

Consequently, magnetic disk devices having the same performance are not required to be prepared, and a storage system using magnetic disk devices can be built with lower cost.

FIG. 10 is an explanatory diagram of a result of distribution of encoded data 66 performed by the controller 10 in a case in which reliability of the magnetic disk devices 14-1 to 14-5 is different. In this case, for example, reliability R1 to R3 of the magnetic disk devices 14-1 to 14-3 is high, and the reliability R4 and R5 of the magnetic disk devices 14-4 and 14-5 is low. In such a case, with respect to 21 units of encoded data 66 which has been encoded from the original data 64 by the controller 10, five of them, each of distributed encoded data 68-1 to 68-3, are stored in each of the magnetic disk devices 14-1 to 14-3 having high reliability R1 to R3; and three of them, distributed encoded data 68-4, 68-5, are stored in each of the magnetic disk devices 14-4, 14-5 having low reliability R4, R5. As the reliability for thus determining the distribution number of the encoded data to be stored in the magnetic disk devices, the value of the operating rate which is generally used as an index of the reliability of a magnetic disk device is used. An operating rate Ai is obtained from mean failure time MTBF (Mean Time Between Failure) and mean repair time MTTR (Mean Time To Repare) in accordance with the following expression.

$$Ai = \frac{MTBF}{(MTBF + MTTR)} \quad (2)$$

Herein, the mean failure time MTBF is an index representing that in how many hours one failure occurs in average, and can be obtained by the following expression.

$$MTBF = \frac{\text{Total Operating Time}}{\text{Total Number Of Failure}} \quad (3)$$

The mean repair time MTTR represents the time taken for repair when failure occurs, and can be obtained by the following expression.

$$MTTR = \frac{\text{Total Operating Time}}{\text{Total Number Of Failure}} \quad (4)$$

Therefore, reliability Ri of a magnetic disk device is a value obtained by the following expression by use of the operating rate Ai of the above described expression (2).

[Expression 5]

$$Ri = \frac{1}{1 - Ai} \quad (5)$$

Furthermore, when the number of units of the encoded data generated through encoding is m, and the reliability of each of n-units of the magnetic disk devices is Ri, the number Di of the encoded data distributed to the magnetic disk device can be determined by the following expression.

$$Di = \frac{Ri}{\sum_{k=1}^{N} R_k} * m \quad (6)$$

Herein, the number m of the units of generated encoded data in the expression (6) can be represented by use of the importance Vi of the file serving as the original data according to the expression (1); therefore, the number Vi of the encoded data finally distributed to each magnetic disk device can be represented by the below expression by use of the importance Di of the file and the reliability Ri of the magnetic disk device.

$$Di = \frac{Ri}{\sum_{k=1}^{N} R_k} * F(V_i) \quad (7)$$

In the above description, the operating rate, Ai of the magnetic disk device is used for determining the reliability Ri of the magnetic disk device; however, the operating time Ti of the magnetic disk devices 14-1 to 14-5, a usable capacity Ci, etc. can be used for determining the number m of the encoded data to be distributed. For example, when the operating time Ti of the magnetic disk device is used, the reliability Ri of the magnetic disk device calculated by the above described expression (5) can be corrected by the below expression.

$$Di = \frac{RTT_i}{\sum_{k=1}^{N} RTT_i} \times R_i \quad (8)$$

When the usable capacity Ci of the magnetic disk device is used, the above described expression (6) is replaced by the below expression.

$$Di = \frac{R_i + V_i}{\sum_{k=1}^{N} (R_i + V_i)} \cdot m \quad (9)$$

Furthermore, in the present invention, when the number N of the units of the magnetic disk devices connected to the controller 10 is changed, the encoded data distribution number Di with respect to the magnetic disk device after change is recalculated in accordance with the above described expression (6), and the encoded data is redistributed.

Figure 11:
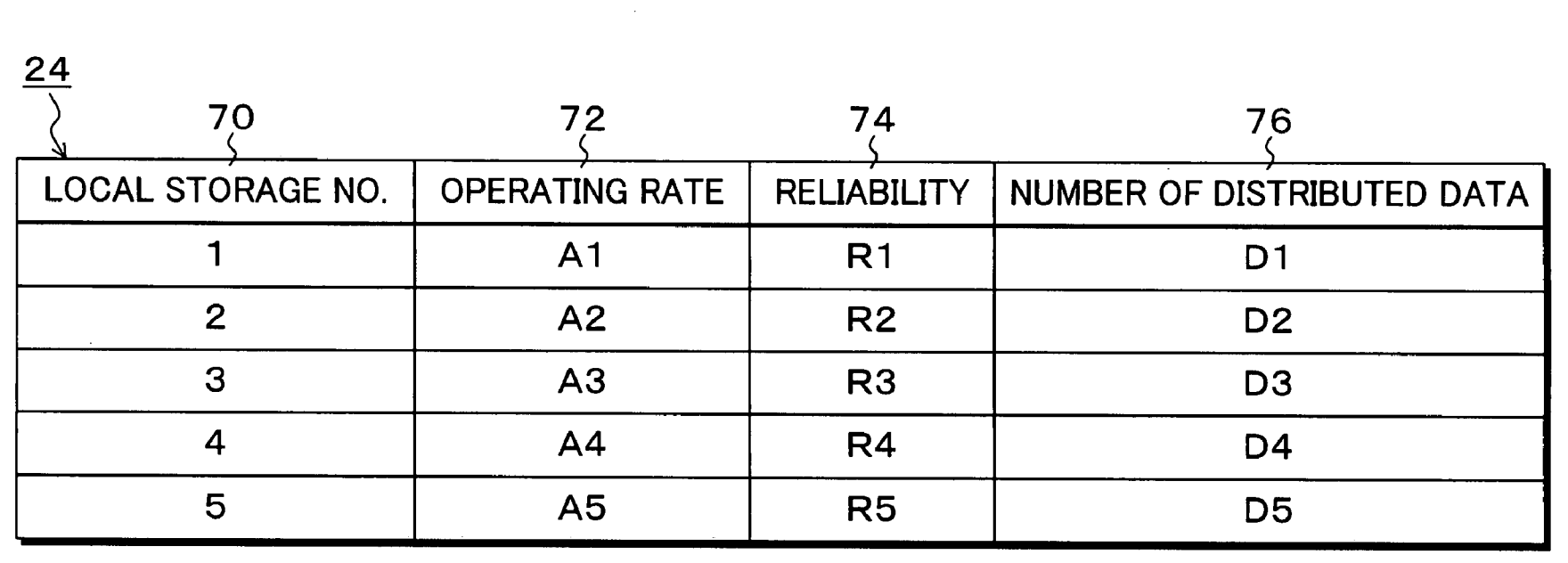

FIG. 11 is an explanatory diagram of the distribution control table 24 used by the distribution processing unit 22 of FIG. 4 for distributing the encoded data to the magnetic disk devices 14-1 to 14-5. The distribution control table 24 of FIG. 11 is formed of local storage numbers 70, operating rates 72, reliability 74, and the number of distributed data 76; wherein the reliability 74 is obtained by the expression (5) from the operating rate 72 calculated by the expression (2), and the number of distributed data 76 finally calculated by the expression (6) is stored. Furthermore, in accordance with needs, correction of the reliability using the operating time Ti of the magnetic disk devices 14-1 to 14-5, or the number of distributed data obtained in a calculation according to the expression (9) using the usable capacity Ci of the magnetic disk device is stored in the table; and the encoded data may be distributed to the magnetic disk devices based on that.

Figure 12:
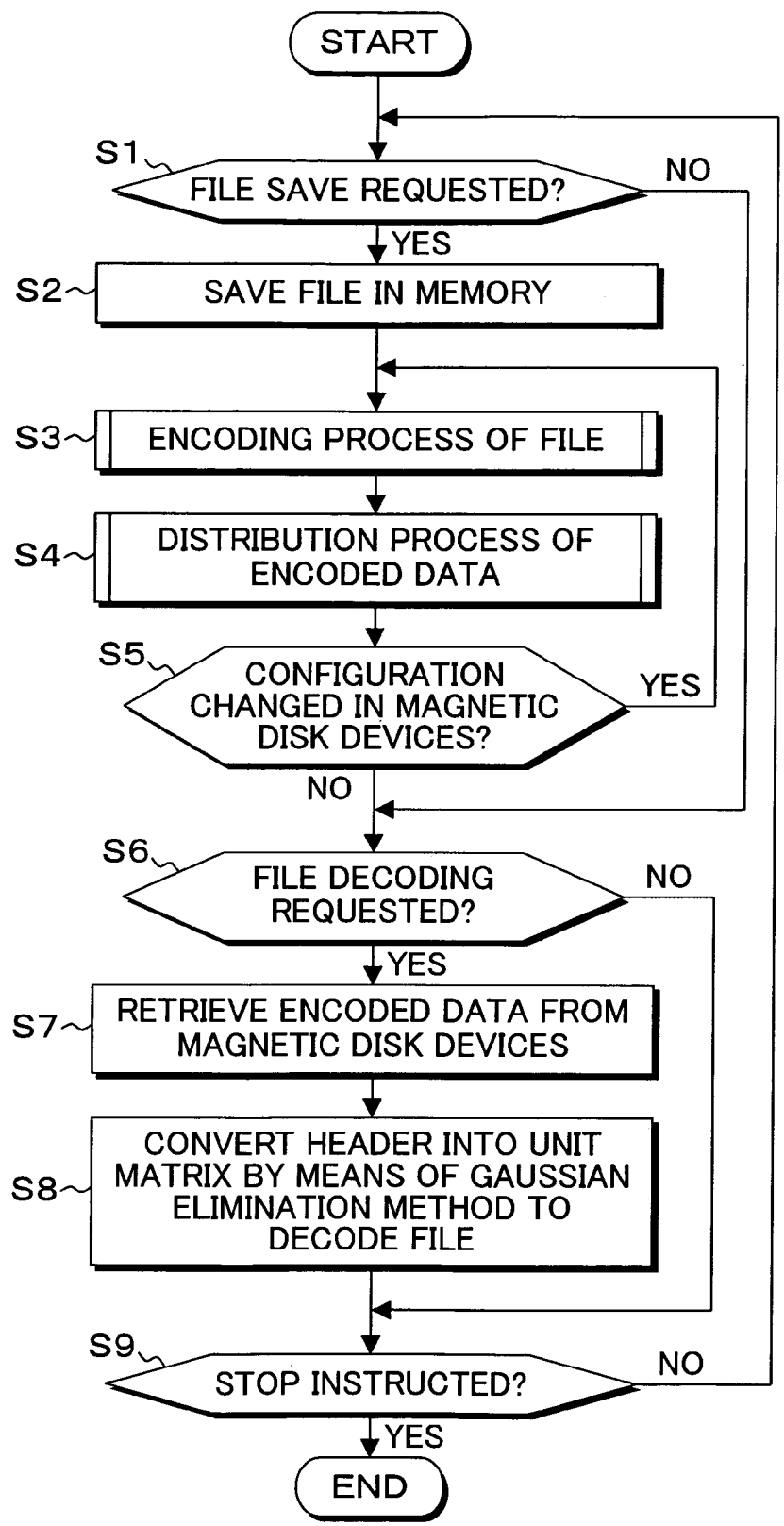
FIG. 12 is a flow chart of storage system control process according to the present invention.

FIG. 12 is a flow chart of a storage system control process performed by the controller 10 of FIG. 4. In FIG. 12, presence of a file save request (write request) from the server 11 is checked in step S1, and when the file save request is received, a file is saved in a memory in the controller 10 in step S2. Subsequently, after the encoding process of the file is executed in step S3, the distribution process in which the encoded data is distributed to the magnetic disk devices 14-1 to 14-5 is performed in step S4.

Subsequently, whether there is a configuration change in the magnetic disk devices, that is, change in the number of units thereof is checked in step S5, and if there is the change, the process returns to step S4 wherein the distribution number of the encoded data is recalculated, and the encoded data is redistributed. If there is no change in the configuration of the magnetic disk devices, presence of a file decoding request from the server 11 is checked in step S6; and if there is the file decoding request (read request), the encoded data distributed to and stored in the magnetic disk devices 14-1 to 14-5 is retrieved therefrom in step S7; and the decoding unit 26 converts the headers into a unit matrix by means of the Gaussian elimination method so as to decode the file of the original data and make a response to and transfer it to the server in step S8. Such processes of steps S1 to S8 are repeated until there is a stop instruction in step S9.

Figure 13:
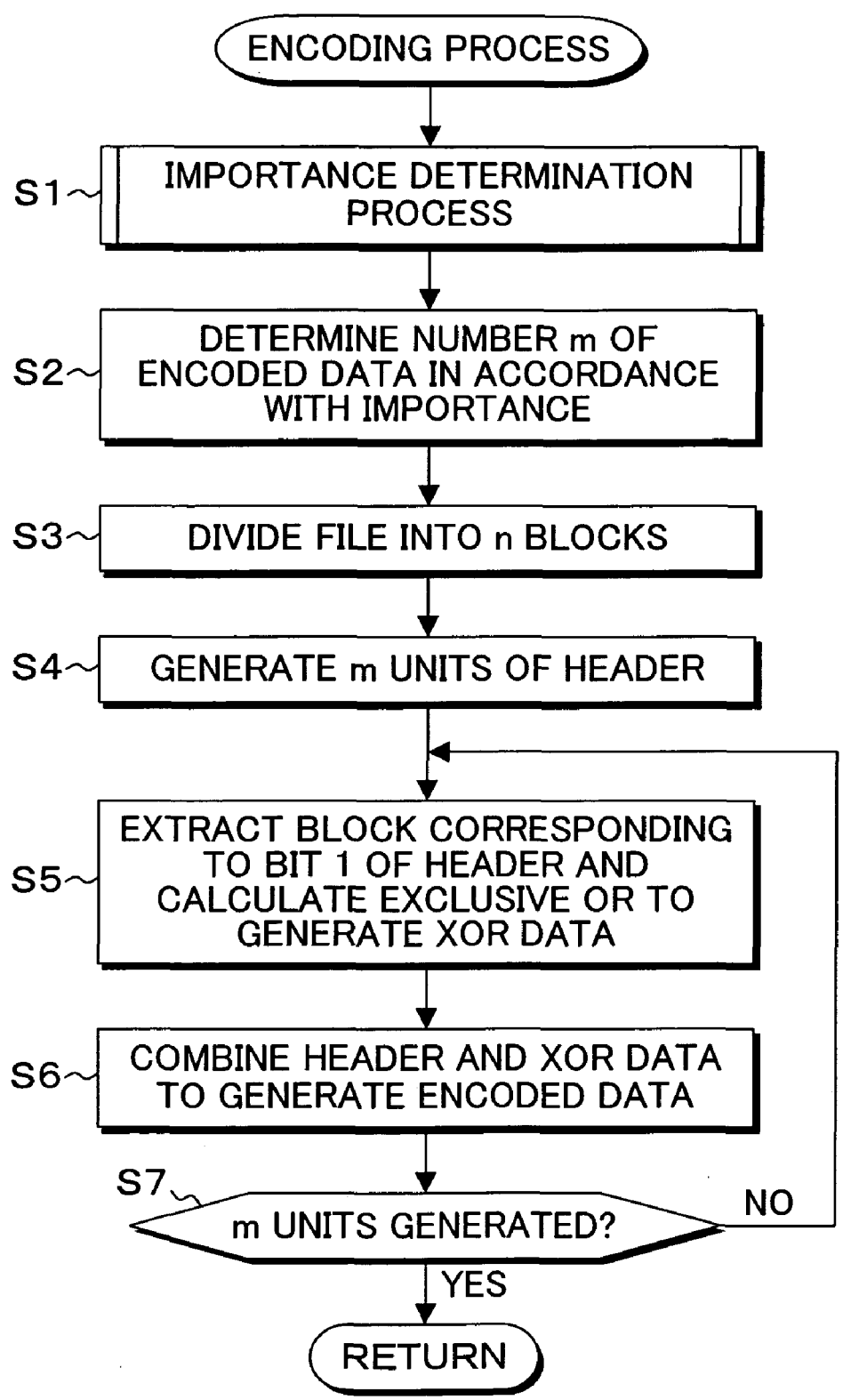
FIG. 13 is a flow chart of the encoding process in step s3 of FIG. 12.

FIG. 13 is a flow chart of the encoding process in step S3 of FIG. 12. In FIG. 12, in the encoding process, after a process of determining the importance of the file which is serving as the original data is performed in step S1, the encoded data number m is determined from the determined importance in accordance with the above described expression (1) in step S2. Subsequently, in step S3, the file which is the original data to be processed is divided into n blocks, for example, into n=1028 blocks; and then, headers corresponding to the encoded data number m are generated in step S4; and the block corresponding to bit 1 of the header is extracted and exclusive OR is calculated, thereby generating XOR data in step S5. Then, in step S6, the header and the XOR data are combined to generate the encoded data. Subsequently, whether m-units of encoded data have been generated or not is checked in step S7; if they have not been generated, the process returns to step S5 wherein the encoded data is similarly generated for the next header; and, if the m-units are generated, the encoding process is terminated, and the process returns to the main routine of FIG. 12.

Figure 14A:
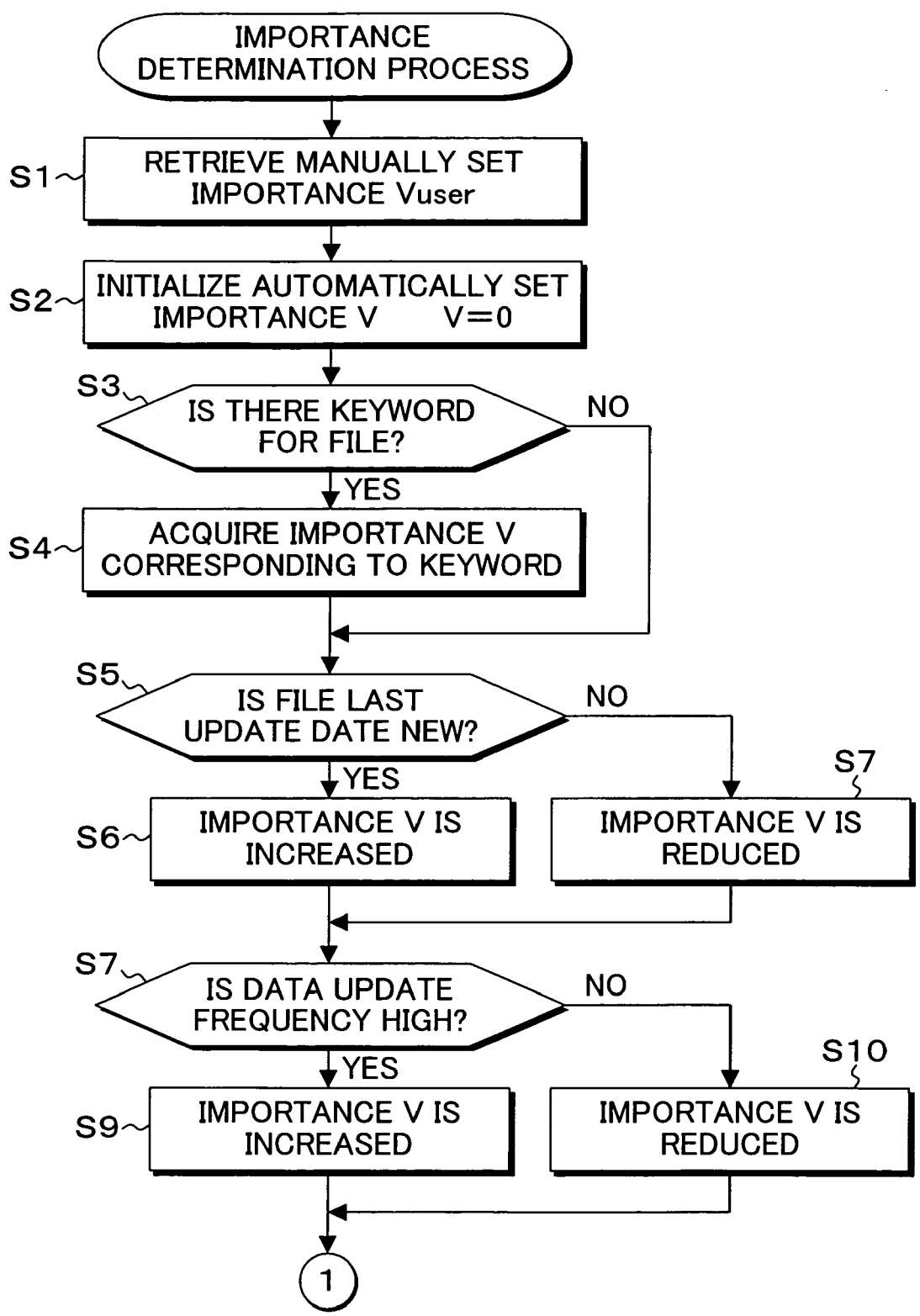
FIGS. 14A and 14B are flow charts of the importance determination process in step s1 of FIG. 13.
Figure 14B:
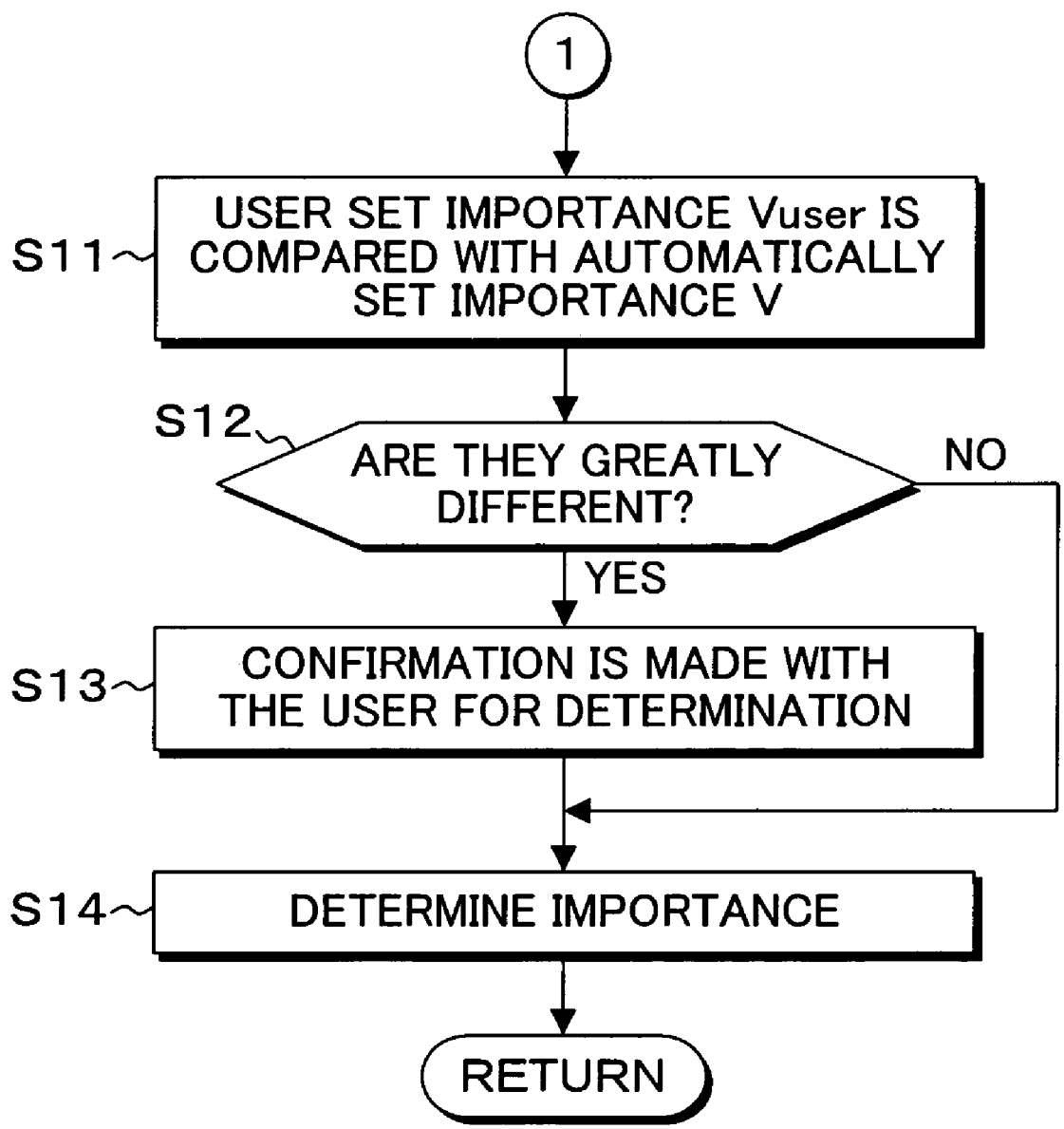

FIGS. 14A and 14B are flow chart of the process of step S1 of FIG. 13 of determining the importance used in the encoding process. In FIGS. 14A and 14B, in the importance determination process, importance Vuser which is set by the user in advance is retrieved in step S1, and automatically set importance V is initialized such that V=0 in step S2. Subsequently, whether there is a keyword in the file which is to be processed is checked in step S3; and, if there is the keyword, in step S4, the importance control table 18-1 such as that shown in FIG. 9A is referenced, and the importance V corresponding to the keyword is retrieved. Subsequently, whether the file last update date is new or not is checked in step S5; and, if it is new, the process proceeds to step S6, wherein the importance V retrieved in step S4 is increased by a predetermined amount or by a predetermined rate. Meanwhile, if the file update date is old, the process proceeds to step S7, wherein the importance V is reduced by a predetermined amount or a predetermined rate. Subsequently, in step S8, whether the update frequency of the data is high or not is checked. If the update frequency is high, the importance V is corrected to be increased in step S9. If the update frequency is low, the importance is corrected to be reduced in step S10. Subsequently, in step S11, the importance Vuser set by the user is compared with the importance V automatically determined by the processes of steps S3 to S10. If they are determined that they are largely different from each other in step S12; the automatically set importance is displayed in the screen of a user terminal via a server, and confirmation is made with the user in step S13; and the importance is determined in step S14. If the difference between them is not large, the importance is determined in step S14 without change. Note that the processes of steps S11 to S13 may be omitted.

Figure 15:
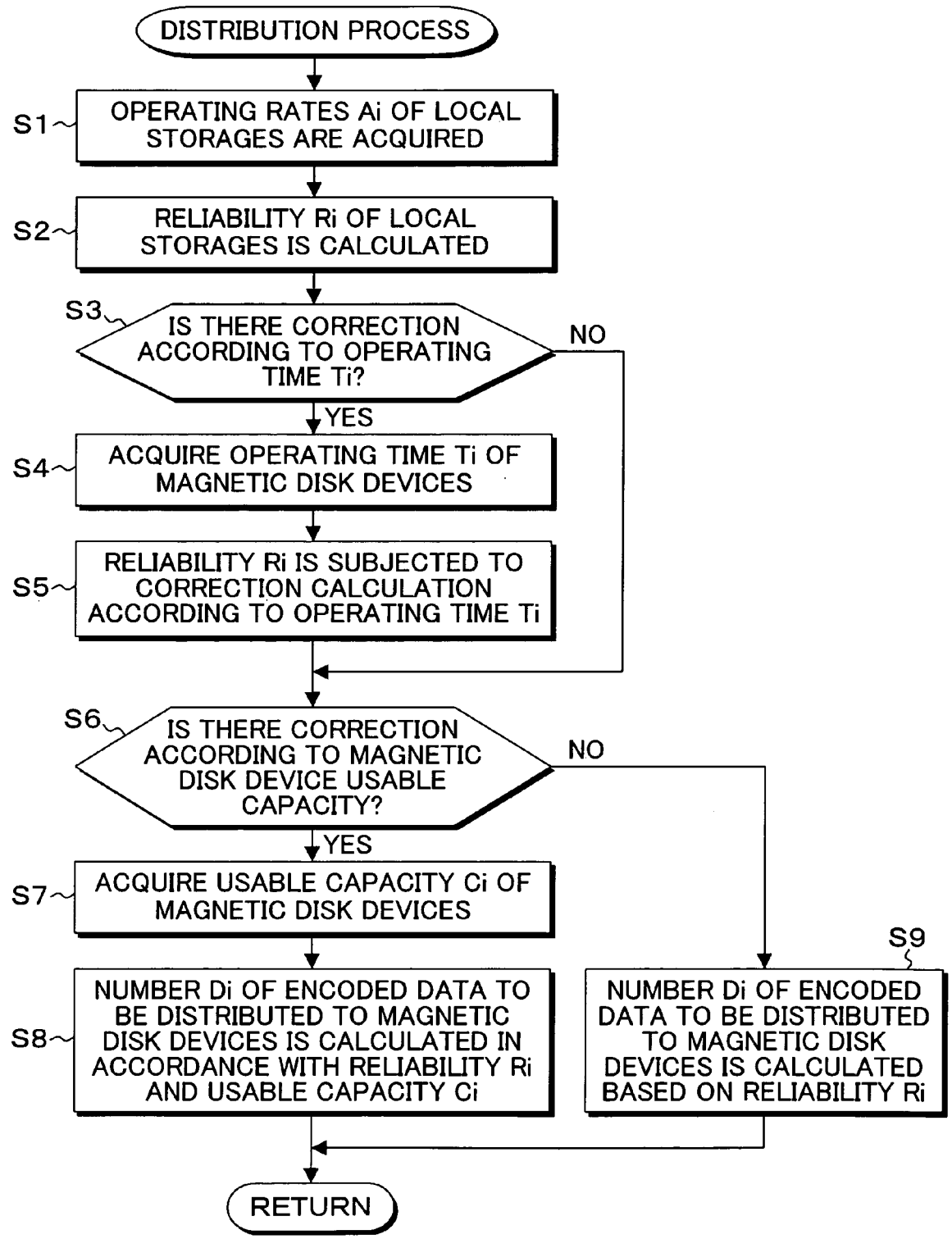
FIG. 15 is a flow chart of the distribution process in step s4 of FIG. 12.

FIG. 15 is a flow chart of the distribution process of the encoded data of step S4 of FIG. 12. In FIG. 15, in the distribution process of the encoded data, the operating rate Ai of the magnetic disk device is obtained by the calculation of the above described expression (2) in step S1, and the reliability Ri of the magnetic disk device is calculated from the above described expression (5) in step S3. Subsequently, presence of correction according to the operating time Ti of the magnetic disk device is checked in step S3; if there is the correction, the process proceeds to step S4, wherein the operating time Ti of the magnetic disk device is acquired; and the reliability Ri is subjected to a correction calculation by the above described expression (8) in step S5.

Subsequently, whether correction by use of the usable capacity of the magnetic disk device is to be made or not is checked in step S6; if the correction is to be made, the usable capacity Ci of the magnetic disk device is acquired in step S7; and the number Di of the encoded data to be transmitted to the magnetic disk device is calculated by the above described expression (9) from the reliability Ri and the usable capacity Ci in step S8. Meanwhile, if the correction by use of the magnetic disk device usable capacity is not found in step S6, the process proceeds to step S9, wherein the number Di of distribution of the encoded data is calculated from the reliability Ri by the above described expression (6). In the calculation of the distribution number of the encoded data in steps S8 and S9, instead of the encoded data number m in the expression (6), it may be calculated from the expression (1) using the importance Vi of the file which is the original data like the expression (7). Moreover, the present invention provides a storage system control program executed by the computer (CPU) of the controller 10 of FIG. 4, and this program has the contents shown in the flow charts of FIG. 12, FIG. 13, FIG. 14A, FIG. 14B and FIG. 15. Moreover, the present invention provides a computer-readable recording medium storing the storage system control program; and this recording medium includes a portable storage medium such as a CD-ROM, a floppy disk (R), a DVD disk, an optical disk, or an IC card; a recording device such as a hard disk provided in/outside a computer system; another computer system and a database thereof. In the present embodiment, as shown in the expression (1), the block division number n is fixed, and the number m of the encoded data is determined in accordance with the importance Vi of the original data, that is, the redundancy Q (=m/n) is changed; however, the block division number n can be determined as $$n = G(Vi)$$

in accordance with the importance of the original data. In this relation, the higher the importance of the original data, the more the block division number is increased. In this case, when the redundancy Q is set as a fixed value in the range of, for example, 1.1 to 1.5, and the block division number n is determined in accordance with the importance Vi, the encoded data number m is uniquely determined by the fixedly-set redundancy Q. Although the above described embodiment employed magnetic disk devices as examples of storage devices, other than that, appropriate storage devices such as optical disk devices, magneto-optical disk devices, semiconductor memory devices may be employed. Moreover, the present invention includes arbitrary modifications that do not impair the object and advantages thereof, and is not limited by the numerical values shown in the above described embodiment.

What is claimed is:

1. A storage system including a plurality of storage devices, the storage system comprising:
    an encoding unit for, after dividing original data into a predetermined division number, generating a plurality of encoded data equal to or more than the division number corresponding to a redundancy by use of a code of which the redundancy is variable;
    a redundancy control unit for varying the redundancy in the encoding unit;
    a distribution processing unit for distributing the plurality of encoded data to the plurality of storage devices and causing the encoded data to be stored in the storage devices; and
    a decoding unit for retrieving the encoded data corresponding to at least the division number of the original data from the storage devices and decoding the original data.

2. The system according to claim 1 wherein
    the encoding unit compares:
    a block dividing unit for dividing the original data into n-units of block data, and
    an encoded data generating unit for generating, merely by a number m according to redundancy Q, headers, in each of which a bitmap specifying one or a plurality of blocks for obtaining exclusive OR in the n-units of block data is disposed, and encoded data comprised of exclusive OR data of the one or plurality of block data specified by the header part;
    wherein the decoding unit retrieves the block number n or more of the encoded data from the plurality of storage devices, and converts the header part into a unit matrix to decode the n-units of block data.

3. The system according to claim 1, wherein the redundancy control unit varies the redundancy in the encoding unit in accordance with a importance degree of the original data.

4. The system according to claim 3, wherein, in the redundancy control unit, the importance degree of the original data is manually set or automatically set in accordance with a keyword contained in the original data, update date and time, or update frequency.

5. The system according to claim 4, wherein, as the automatic setting of the importance degree, the redundancy control unit sets importance degree corresponding to the keyword contained in the original data, and then, corrects the importance degree in accordance with the update date and time or the update frequency or both.

6. The system according to claim 1, wherein the distribution processing unit determines the distribution number of the plurality of encoded data in accordance with reliability or usable capacity of the plurality of storage devices.

7. The system according to claim 6, wherein, in the distribution processing unit, a reliability of the storage device is manually set or automatically set based on operating time.

8. The system according to claim 6, wherein the distribution processing unit sets the reliability of the storage device in accordance with the operating time, and then, corrects the importance in accordance with a usable capacity of the storage device.

9. The system according to claim 1, wherein, when the storage device is newly added or eliminated, based on the storage devices after the change, the encoded data is regenerated in the encoding unit, and then, the encoded data is redistributed by the distribution processing unit.

10. A control method of a storage system including a plurality of storage devices, the control method comprising:
    an encoding step of, after dividing original data into a predetermined division number, generating a plurality of encoded data equal to or more than the division number corresponding to a redundancy by use of a code of which the redundancy is variable;
    a redundancy control step of varying the redundancy in the encoding step;
    a distribution processing step of distributing the plurality of encoded data to the plurality of storage devices and causing the encoded data to be stored in the storage devices; and
    a decoding step of retrieving the encoded data corresponding to at least the division number of the original data from the storage devices and decoding the original data.

11. The control method of the storage system described in claim 10, wherein
    the encoding step compares:
    a block dividing step of dividing the original data into n-units of block data, and
    an encoded data generating step of generating, merely by a number m according to redundancy Q, headers, in each of which a bitmap specifying one or a plurality of blocks for obtaining exclusive OR in the n-units of block data is disposed, and encoded data comprised of exclusive OR data of the one or plurality of block data specified by the header step;
    wherein in the decoding step, the block number n or more of the encoded data is retrieved from the plurality of storage devices, and the header step is converted into a unit matrix to decode the n-units of block data.

12. The method according to claim 10, wherein, in the redundancy control step, the redundancy in the encoding step is varied in accordance with a importance degree of the original data.

13. The method according to claim 12, wherein, in the redundancy control step, the importance degree of the original data is manually set or automatically set in accordance with a keyword contained in the original data, update date and time, or update frequency.

14. The method according to claim 13, wherein, in the redundancy control step, as the automatic setting of the importance degree, importance degree corresponding to the keyword contained in the original data is set, and then, the importance degree is corrected in accordance with the update date and time or the update frequency or both.

15. The method according to claim 11, wherein, in the distribution processing step, the distribution number of the plurality of encoded data is determined in accordance with reliability or usable capacity or both of the plurality of storage devices.

16. The method according to claim 15, wherein, in the distribution processing step, a reliability of the storage device is manually set or automatically set based on operating time.

17. The method according to claim 15, wherein, in the distribution processing step, the reliability of the storage device is set in accordance with the operating time, and then, corrected in accordance with a usable capacity of the storage device.

18. The method according to claim 10, wherein, when the storage device is newly added or eliminated, based on the storage devices after the change, the encoded data is regenerated in the encoding step, and then, redistributed in the distribution processing step.

19. A computer-readable storage medium which stores a storage control program causing a computer of a storage system including a main storage apparatus for storing original data and a plurality of storage devices for distributing and storing the data of the storage apparatus, to execute steps comprising:

an encoding step of, after dividing original data into a predetermined division number, generating a plurality of encoded data equal to or more than the division number corresponding to a redundancy by use of a code of which the redundancy is variable;

a redundancy control step of varying the redundancy in the encoding step;

a distribution processing step of distributing the plurality of encoded data to the plurality of storage devices and causing the encoded data to be stored in the storage devices; and a decoding step of retrieving the encoded data corresponding to at least the division number of the original data from the storage devices and decoding the original data.

20. The storage medium according to claim 19, wherein the encoding step compares:

a block dividing step of dividing the original data into n-units of block data, and an encoded data generating step of generating, merely by a number m according to redundancy Q, headers, in each of which a bitmap specifying one or a plurality of blocks for obtaining exclusive OR in the n-units of block data is disposed, and encoded data comprised of exclusive OR data of the one or plurality of block data specified by the header step; wherein in the decoding step, the block number n or more of the encoded data is retrieved from the plurality of storage devices, and the header step is converted into a unit matrix by means of the Gaussian elimination method to decode the n-units of block data.

* * * * *